Patented Dec. 4, 1934

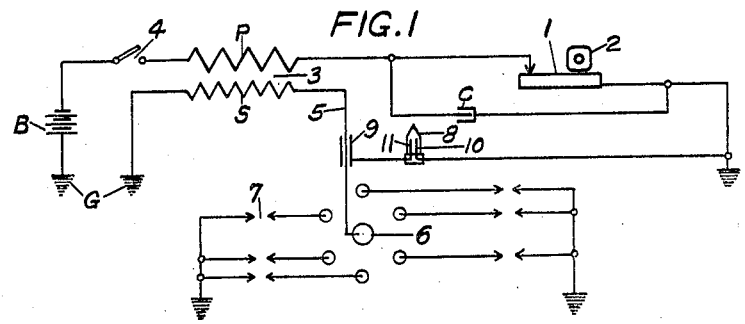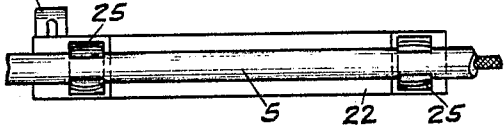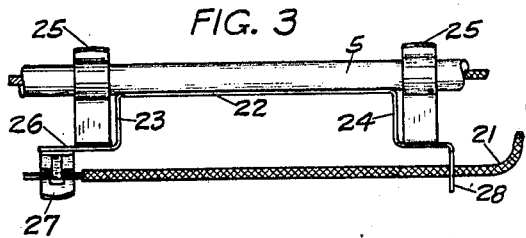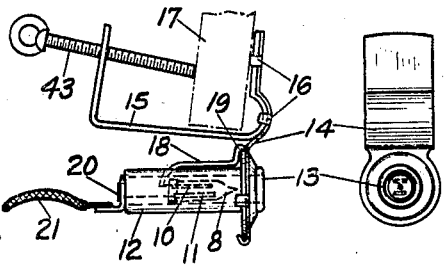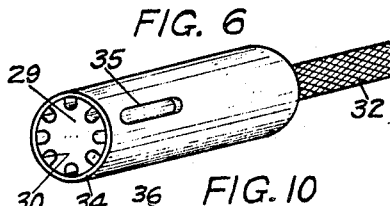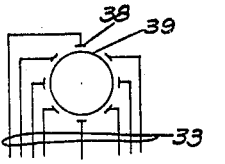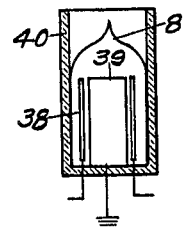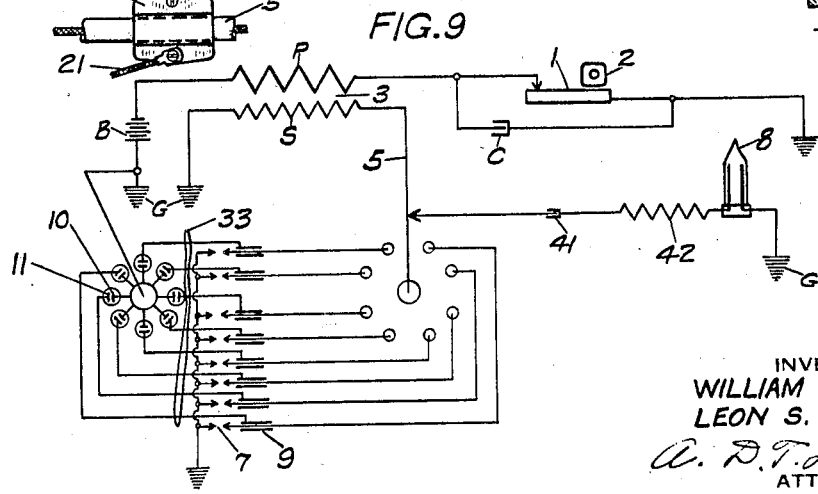

1,983,341

UNITED STATES PATENT OFFICE 1,983,341

APPARATUS FOR AND METHOD OF TESTING THE CONDITION OF THE HIGH-TENSION IGNITION SYSTEM OF AN OPERATING INTERNAL COMBUSTION ENGINE

William E. Brown, Milwaukee, Wis., and Leon S. Brach, East Orange, N. J.; said Brown assignor to said Brach Application September 20, 1932, Serial No. 633,970

4 Claims. (Cl. 175—183)

This invention relates to means for observing and determining the condition of the ignition system on an operating internal combustion engine such as used in the automotive industry on automobiles, motor boats, airplanes, tractors, farm engines, and the like.

It is the usual practice for an operator of an automotive vehicle to operate the same without giving much attention to the ignition system until trouble or failure of a part or whole thereof occurs, and many times these occurrences take place unexpectedly at inconvenient times and localities where it is impossible or hard to make repairs or get service.

It is therefore the principal object of our invention to provide a testing means or apparatus which may be installed on the vehicle or engine in such a way as to give a continuous indication of the manner in which the ignition system is functioning.

While obtaining our principal object, it is another object of our invention to provide an indicating method and apparatus for the purpose described which is relatively simple, cheap to manufacture, and easy and cheap to install or apply.

Another object of our invention is to provide a testing means for the ignition system which may be used to great advantage by the garage or service man in determining the condition in the ignition system on an automotive vehicle.

Other and ancillary objects will be discerned from a study of the specification taken in connection with the annexed drawing, wherein:

Figure 1 illustrates diagrammatically an ignition system for a six-cylinder engine.

Figure 2 is a plan view of one form of a part of the apparatus used in the testing system.

Figure 3 is a side elevation of Figure 2.

Figure 4 is a side elevation of the indicating means comprising part of the apparatus used in the testing system.

Figure 5 is a view of Figure 4 looking at the right-hand end.

Figure 6 is a perspective view of a modified form of apparatus which may be used as a permanent installation or as a portable testing device.

Figure 7 is a part-sectional and part-elevational view of a further modified form of the indicating means used in the testing system.

Figure 8 is a diagrammatic view of the indicating device shown in Figure 7.

Figure 9 is a diagrammatic view of an ignition system suitable for use on an eight-cylinder engine, and utilizing the indicating device shown in Figure 6.

Figure 10 is a plan view of a modified form of part of the testing apparatus.

Figure 11 is an end view of Figure 10.

Referring now to the details wherein like numbers refer to corresponding parts in the various views, and with particular reference to Figure 1, 1 is a circuit breaker operated by a cam 2 to control the operation of current in battery B through the primary P of the ignition coil 3, a switch 4 being indicated in the primary circuit of the coil. The secondary coil S has one end grounded at G and the other terminal is connected by the lead 5 to the part 6 diagrammatically illustrating the rotating finger of the usual distributor, the terminals of which are connected to their respective spark plugs on the engine, indicated by the gaps 7. The usual condenser C is connected across the circuit breaker 1.

Our invention utilizes the corona or capacity effect which is always present in the high-tension leads running from the secondary S of the spark coil 3 to the distributor, or in the individual cables running from the distributor to the spark plugs 7. As indicated in Figure 1, we have shown an indicator 8 connected between the grounded side of the ignition system and a device 9 that is adapted to be attached to the cable 5 or to any one of the cables running from the distributor to the spark plug.

The indicator 8 preferably comprises a small glass tube within which are mounted electrodes 10 and 11 which are spaced a short distance apart, and after the tube 8 has been evacuated, it is filled with an inert gas such as neon. The lamp bulb containing the electrodes 10 and 11 is mounted in any suitable manner as by means of a tubular socket 12 preferably made of good insulating material, one end 13 of the socket extending through a support 14 attached to a bracket 15 in any satisfactory manner as by bent-over clips 16, thus forming, in effect, a facing strip for the bracket as well as making electrical connection therewith. The bracket 15 is provided with a clamping means such as the screw 43 for fastening the bracket to any suitable part of the automotive vehicle, such as a cowl member 17. If it is desired to mount the indicating device including the lamp bulb 8 and its socket on the steering column, or in some other manner, the bracket 15 can of necessity be made to suit the conditions.

One of the electrodes of the lamp bulb, for example 10, is connected to a terminal piece 18 permanently attached in any satisfactory manner as at 19 to the member 14, the free end of which extends below the bracket 15. A terminal 20 is carried by the free end of the socket 12 and is connected to the electrode 11 of the lamp bulb. To the terminal 20 is attached an insulated conductor 21 which extends to a current-collecting device that is adapted to be attached to the outer surface of one of the ignition cables. As shown in Figure 1, it is associated with the cable 5.

One form of this device, shown in Figures 2 and 3, includes a strip 22 which is adapted to lie in close proximity to the surface of the ignition cable. The strip is bent downwardly at 23 and 24, and adjacent the downwardly bent end 23 a spring-clip 25 is attached. Adjacent the end 24, a similar spring-clip 25 is fastened to the strip 22. To the end 26 of the strip 22 there is fastened a spring-clip 27 of the "Fahnstock" type to which one end of the conductor 21 is attached. The opposite end of the strip 22 is bent downwardly at 28 and is provided with a hole through which the cable 21 passes, thereby giving a support to the cable 21 on its way to the clip 27.

The current-collecting device shown in Figures 2 and 3 and just described, is adapted to be snapped over any one of the high-tension cables; for example, cable 5, as indicated in Figures 2 and 3, and when the device is so attached, together with the indicating apparatus shown in Figures 4 and 5, the lamp bulb, which is designed to give a good glow at about 100 volts, will glow in a uniform manner when the ignition system is in good working condition.

On the other hand, if the circuit breaker 1 is functioning poorly, or one of the spark plugs is open or short-circuited, or there is something wrong with the coil or battery by which these troubles are reflected into the ignition cable 5, the lamp indicator will at once show an irregular action in its glow, and the operator will know that there is trouble in the ignition system, it being understood that the device attached to the cable 5 picks up through the capacity effect, sufficient current to make the bulb 8 glow. This action does not draw any perceptible current from the ignition system and does not affect the operation thereof, as the resistance of the lamp bulb 8 is of a very high order, something on the order of 50,000 to 100,000 ohms or more, and there is no direct contact with the wire of the ignition cable.

In the form of device shown in Figure 6 and diagrammatically illustrated in Figure 9, a holder 29 is provided with a plurality of slots 30 to carry one of the small lamp bulbs 8 for each cylinder of the engine, and it is connected up by means of the wires 31, composing the cable 32, to an attachment device such as shown in Figures 2 and 3, or in Figures 10 and 11 to which reference will be later made, to the individual plug cables 33. When so installed, a continuous indication is given on each and every plug circuit, so that if a plug becomes short-circuited or the cable falls from the plug, the lamp bulb connected in association with this circuit would indicate trouble thereon by the difference in glow between this lamp bulb and the others.

As shown in Figure 6, the holder may be provided with a rotatable sleeve 34, preferably of insulating material, and this sleeve may have an opening 35 whereby any one of the lamp bulbs within the holder 29 may be exposed to view through the sleeve which in some cases may have the end covered so that the only light from the bulb will come through the slot 35 when the device shown in Figure 6 is used as a hand-testing apparatus.

It is apparent that the apparatus or device to be attached to the ignition cable may take various forms, an alternative form being shown in Figures 10 and 11, wherein a pair of clamps 36 and 37 may be fastened to the cable. It is to be understood that the area of the cable attachment is sufficient to pick up the desired amount of current to energize the lamp.

In Figures 7 and 8, we have indicated a lamp 8 having a plurality of electrodes 38 spaced apart from a common or ground electrode 39, the lamp 8 being mounted in any suitable receptacle 40 and the whole arranged as a testing device which may be permanently installed on the vehicle or used as a portable testing device, the same as the device shown in Figure 6.

It is within the scope of our invention to connect the lamp bulb 8 directly to one of the metallic conductors in the ignition system through some impedance such as a very small capacity condenser 41 and a resistance 42, either one of which individually, or both in combination, may be used, but we prefer the arrangements previously described.

From what has been said, it will be clear that our testing system has many advantages; for example, on automobiles that are equipped with free wheeling, or when the car is allowed to coast with the gearshift lever in neutral or the clutch out, the indicating system will show that the engine is still running. This is essential as it sometimes becomes necessary to utilize the engine instantly, and if it has stopped during the conditions above indicated, it cannot be utilized without starting it again with the starter, which requires the operator's attention that should be given to what may be an emergency at hand.

In the observation and testing system described, the lamp bulb will begin to wink noticeably when the engine slows down, indicating to the operator that the throttle should be opened somewhat. With this system installed on an automotive vehicle, the driver soon becomes accustomed to the changes in the glow of the lamp or what we term the "wink", and to know what these changes mean.

While we have mentioned that the lamp bulb will give a good glow at about 100 volts, it may be further stated that in order to have this apparatus operate properly and give a relatively high degree of brilliancy in the neon tube, it is necessary to use a lamp or tube that will function on a relatively low voltage, and the tube which we preferably employ is one that will pass current readily at 90 volts D. C. We find we can check better with D. C. than A. C., hence the D. C. rating is used, but only for the purpose of having a standard by which the neon tubes can be compared. It is to be understood that the tubes used are readily excited and will work on a much lower A. C. voltage. As shown in the drawing, the lamp or tube is mounted so as to be properly shielded whereby the glow will be visible under ordinary daylight conditions.

As has been indicated, it will appear that the mechanical details entering into the construction of the cable attachment device on the indicator holder mechanism may be varied over a wide range without departing from the spirit of our invention or the scope of the appended claims.

Having thus described our invention, what we claim is:

1. Apparatus for testing any high-tension ignition cable circuit on an operating internal combustion engine including two units interconnected by a single conductor, one unit comprising an indicator carrying a gas-filled bulb permanently attached to a support for observation purposes, said bulb having a plurality of spaced electrodes, one of which is connected to the ground side of the ignition system, the other of said units including a pair of spaced spring-clips adapted to be snapped over the cable without piercing it, said clips being carried on opposite ends of a metallic strip so the strip will lie in close proximity to said cable, means being provided for attaching said conductor to said clip and strip assembly.

2. Apparatus for testing any high-tension ignition cable circuit on an operating internal combustion engine including two units interconnected by a single conductor, one unit comprising an indicator carrying a gas-filled bulb permanently attached to a support for observation purposes, said bulb having a plurality of spaced electrodes, one of which is connected to the ground side of the ignition system, the other of said units including a metallic strip having clip-seats formed thereon, spring-clips fastened to said seats, said clips adapted to snap over said cable without piercing it, a quick attachable conductor fastener mounted on one end of the strip, the opposite end of which is provided with means for supporting said conductor going to said fastener.

3. Apparatus for testing any high-tension ignition cable circuit on an operating internal combustion engine including two units connected by a single conductor, one unit being quickly attachable to the outer part only of the ignition cable, the other unit comprising an indicator carrying a gas-filled bulb permanently attached to a support for observation purposes, said bulb having a plurality of spaced electrodes, one of which is connected to the ground side of the ignition system; further characterized in that said indicator is provided with mounting which includes a bracket adapted to be quickly fastened to said support, a facing member fastened to one end of the bracket and extending below the same, a socket for said bulb carried by the free end of said facing member and a terminal piece positioned on the outer surface of said socket and completing the ground connection to said bulb terminal to said bracket.

4. Apparatus for testing the spark plug cable circuits on an operating internal combustion engine including, a plurality of current-collecting elements adapted to be quickly attached, one to the outer part only of each spark plug cable, an indicator including a circular holder having bulb recesses therein around the periphery thereof, at least as many as there are spark plug cables to be tested, bulbs held in said recesses, each of said bulbs having a plurality of spaced electrodes and filled with an inert gas, such as neon, an electrode of each bulb adapted to be connected to one of said current-collecting elements, while the other electrodes of said bulbs are electrically connected to the frame of the engine, said holder being provided with a rotatable sleeve fitting over the outer periphery thereof, said sleeve having a slot therein whereby any bulb may be exposed around the periphery of the holder.

WILLIAM E. BROWN.
LEON S. BRACH.